United States Patent [19]

Lee et al.

[11] Patent Number: 5,686,048
[45] Date of Patent: Nov. 11, 1997

[54] AGITATOR FOR SUSPENSION POLYMERIZATION OF VINYL CHLORIDE AND SUSPENSION POLYMERIZATION METHOD USING THE SAME

[75] Inventors: Dong Hyun Lee; Dae Yong Kim; Young Min Choi, all of Yusung-ku; Woong Su Kim; Jeong Hee Rho, both of Kunsan-city; Il Won Kim, Koonpo-city; Ho Youn Won, Yusung-ku, all of Rep. of Korea

[73] Assignee: Hanwha Chemical Corporation, Seoul, Rep. of Korea

[21] Appl. No.: 555,337

[22] Filed: Nov. 8, 1995

[30]     Foreign Application Priority Data

Nov. 14, 1994 [KR] Rep. of Korea .................. 1994-29841

[51] Int. Cl.$^6$ ....................................................... C08F 2/00
[52] U.S. Cl. ......................... 422/135; 366/279; 366/343; 526/78; 526/88
[58] Field of Search ..................... 422/131, 135; 366/343, 279; 526/78, 81, 88

[56]     References Cited

U.S. PATENT DOCUMENTS

| | | | |
|---|---|---|---|
| 4,189,552 | 2/1980 | Kuwata et al. | 526/84 |
| 4,716,021 | 12/1987 | Akiyama et al. | 422/135 |
| 4,849,482 | 7/1989 | Kobayashi et al. | 526/78 |
| 5,055,273 | 10/1991 | Wilhelm et al. | 422/135 |

FOREIGN PATENT DOCUMENTS

| | | |
|---|---|---|
| 0402662 | 11/1990 | European Pat. Off. . |
| 0526741 | 10/1993 | European Pat. Off. . |

*Primary Examiner*—Nina Bhat
*Attorney, Agent, or Firm*—Birch, Stewart, Kolasch & Birch, LLP

[57]     ABSTRACT

The present invention relates to an agitator for suspension polymerization having a more improved structure in effect in contrast to the earlier agitator. The present invention also relates to an improved suspension polymerization method of vinyl chloride using a polymerization reactor equipped with that agitator, by which vinyl chloride resin having excellent quality can be prepared with a diminution of the number of fish eyes which cause many problems such as deterioration of the processed article, low productivity, etc.

12 Claims, 1 Drawing Sheet

AGITATOR FOR SUSPENSION POLYMERIZATION OF VINYL CHLORIDE AND SUSPENSION POLYMERIZATION METHOD USING THE SAME

BACKGROUND OF INVENTION

1. Field of Invention

The present invention relates to an agitator for suspension polymerization of vinyl chloride and to a suspension polymerization method using the same.

More specifically, the present invention relates to an agitator for suspension polymerization having more improved structure and effect in contrast to the earlier agitator. The present invention also relates to an improved suspension polymerization method for vinyl chloride monomer (VCM) using a polymerization reactor equipped with that agitator, by which vinyl chloride resin having excellent quality can be prepared with a reduction in the number of fish eyes which cause many problems such as deterioration in the processed articles, low productivity, etc.

2. Background Art

Hitherto, as an agitator used in polymerization reactor, Brumagine type, Paddle type, Pfaudler type, Propeller type and Turbine type agitators have been known in the art and a suitable one for the temporary purposes has been selected and used. Among these agitators, it has been recognized that the Brumagine type agitator is adequate for the dispersion of VCM droplets, has a high shear force and can rotate at a high speed without any increase of power required for agitation. Accordingly, the Brumagine type agitator has been more widely used for the suspension polymerization reaction of vinyl chloride monomer than the Paddle or Pfaudler type agitators. However, the Brumagine type agitator has some problems in that the amount of up/down flow is relatively low and agitation in the system is somewhat irregular.

Recently, the market requirement for reducing the number of fish eyes of vinyl chloride resin and the residual monomer has been more strict. Particularly, it has been recognized that fish eye causes serious problems in the area of polymeric plasticizer having relatively low plasticating performance and high viscosity such as polyester, etc. Therefore, the attempts for manufacturing a resin having excellent quality by reducing the number of fish eyes has increased, but nevertheless any progress in the study has not been accomplished.

Accordingly, the present inventors have extensively examined a cause of fish eye formation to solve the problems mentioned above, and as a result perceived that the formation of fish eye can be greatly reduced by increasing the frequency of dispersion and coalescene as high as possible in the course of the formation of particles at the initial polymerization stage so as to increase the uniformity of the particles and thus inhibit the formation of porous particles which is produced when the degree of dispersion is low. On the basis of such a perception, the present inventors have further studied the earlier Brumagine type agitator, and consequently found an astonishing fact that vinyl chloride resin having excellent quality can be prepared by modifying the agitator for polymerization.

Therefore, it is an object of the present invention to provide an improved agitator for suspension polymerization of vinyl chloride which is a modified Brumagine type agitator.

It is another object of the present invention to provide a suspension polymerization method using the agitator as mentioned above so as to prepare a vinyl chloride resin having excellent physico-chemical properties.

The foregoing has outlined some of the more pertinent objects of the present invention. These objects should be construed to be merely illustrative of some of the more pertinent features and applications of the invention. Many other beneficial results can be obtained by applying the disclosed invention in a different manner or modifying the invention within the scope of the disclosure. Accordingly, other objects and a more thorough understanding of the invention may be had by referring to the disclosure of invention, in addition to the scope of the invention defined by the claims.

BRIEF DESCRIPTION OF THE DRAWINGS

For a thorough understanding of the nature and objects of the invention, reference should be made to the following detailed description taken in connection with the accompanying drawings in which.

DISCLOSURE OF INVENTION

Figure 1:
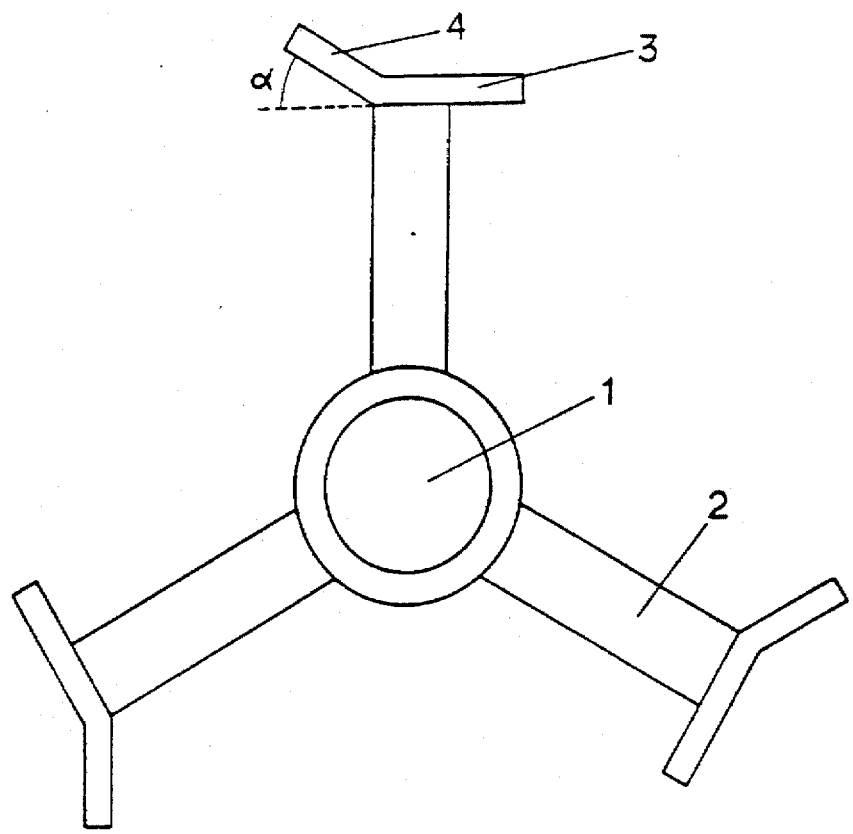
FIG. 1 represents a plane view of the agitator for suspension polymerization of vinyl chloride according to the present invention.
Figure 2:
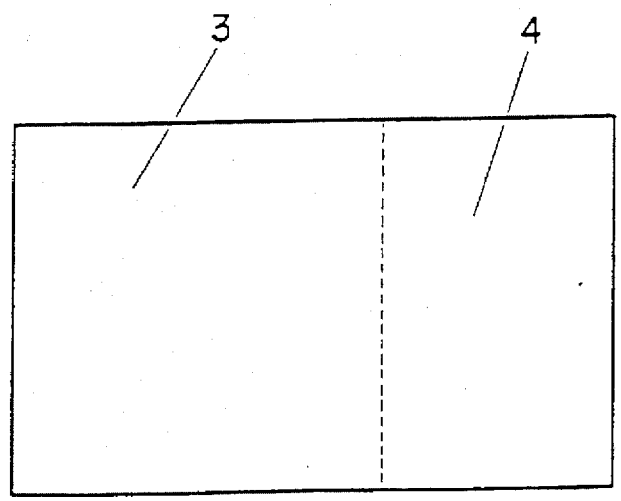
FIG. 2 represents a front view of the main wing of the agitator shown in FIG. 1.

In one aspect, the present invention relates to an improved agitator for suspension polymerization characterized in that a main wing(3) of the agitator is attached to the front of a supporting stem(2) which orients perpendicularly from a vertical axis(1) and a slope is formed between the main wing(3) and a backswept wing(4) at an angle $\alpha$ as represented in FIG. 1.

In FIG. 1, the plane view represents a conventional Brumagine type agitator when $\alpha$ is zero and also approximately represents a Turbine type agitator when $\alpha$ is 90°. Therefore, the present invention relates to a novel agitator in which an angle between the main wing(3) and the backswept wing(4) is changed from that of the conventional Brumagine type agitator.

According to the agitator of the present invention, the effect of reducing the number of fish eyes of the produced vinyl chloride resin can be accomplished by increasing the power required for agitation per unit volume. That is, the number of fish eyes of the vinyl chloride resin prepared by using the present agitator can be highly reduced not only because agitation efficiency has been improved but also because uniformity of the particles contained in a polymerization reactor has been increased by the increment of the required power and the frequency of dispersion and coalescence of monomer droplet at an initial stage of polymerization reaction. Particularly, when a suspension polymerization reaction is carried out by combining a reflux condenser with a polymerization reactor having the agitator of the present invention, a more prominent effect can be accomplished without any additional structural modification, i.e., the uniformity of the suspension polymerization mixture can be improved because the up/down flow in the system is properly developed and the inhibiting effect against gas-liquid interfacial raising phenomena is obtained.

It is preferable that the angle $\alpha$ between the main wing(3) and the backswept wing(4) is in the range of 5° to 60°. In the case of less than 5°, the agitation effect may be insufficient. In the case of more than 60°, irregular polymerization may occur due to an excessive exhaustion of the agitation power and to an over dispersion.

Further, a desirable result can be obtained when the area of the backswept wing(4) is in the range of 10 to 60% with respect to that of the main wing(3). When it is less than 10%, shearing effect, agitation effect, etc. may be insufficient and in the case where it is more than 60%, irregular polymerization such as a formation of coarse particles or fine powder may occur due to an excessive exhaustion of the agitation power and to an over dispersion in the same manner as when α exceeds 60°.

By using the agitator for suspension polymerization according to the present invention as explained above, a polymerization reaction of vinyl chloride monomer or copolymerization reaction of vinyl chloride and other monomers can be carried out. The reaction of the present invention is carried out by way of suspension polymerization in the presence of a polymerization initiator and a suspending agent, thereby an improved effect such as a reduction of the number of fish eyes is obtained. Specifically, more improved effects can be obtained when a polymerization reactor equipped with reflux condenser is used.

As the monomer which can be copolymerized with the vinyl chloride monomer in the suspension polymerization according to the present invention, one or more selected from an olefin such as ethylene, propylene, etc., a vinyl ester such as vinyl acetate, vinyl stearate, etc., an acrylic acid ester such as methyl acrylate, methylmetacrylate, etc., an acid ester or anhydride of maleic acid or fumaric acid, etc., a nitrile such as acrylonitrile, etc., a vinylidene such as vinylidene chloride, etc. can be mentioned.

As the polymerization initiator which can be used in the present invention, one or more selected from the initiator conventionally used in suspension polymerization reaction of vinyl chloride, for example, an organic peroxide such as lauroyl peroxide, 3,5,5-trimethyl hexyl peroxide, t-butyl peroxipivalate, t-butyl peroxineodecanoate, diisopropyl peroxidicarbonate, di-2-ethyl hexyl peroxidicarbonate, acetyl cyclohexyl sulfonylperoxide, etc., an azo compound such as α,α'-azobisisobutyronitrile, α,α'-azobis-2,4-methylvaleronitrile, etc., can be mentioned.

The suspending agent used in the present invention is known in this art. For example, partially saponified polyvinyl alcohol, vinyl acetate-maleic anhydride copolymer, polyvinyl pyrrolidone, gelatin, methyl cellulose, hydroxy propyl cellulose or hydroxy ethyl cellulose may be used.

In addition, the suspension polymerization reaction according to the present invention can be carried out in the presence of a molecular weight modifier, for example, benzene, toluene, t-butyl benzene, butanol, carbon tetrachloride or n-butyl mercaptan.

Depending upon circumstances, the polymerization initiator, suspending agent and molecular weight modifier may be used as additives in the polymerization method according to the present invention. They can be added at one time before the reaction is carried out, or added over several times during the reaction. The preferred amount of each additives can be determined by a person skilled in this art according to a conventional manner. In general, with respect to the monomer used, the polymerization initiator can be used in an amount of 100 to 1000 ppm depending upon the activity of the initiator and polymerization temperature. The suspending agent can be used in an amount of 500 to 2000 ppm depending upon the saponification value and viscosity. The molecular weight modifier can be used in an amount of 100 to 1000 ppm depending upon the degree of desired polymerization, polymerization temperature and molecular weight controlling capability.

The preferable range of temperature at which the polymerization reaction according to the present invention can be carried out is between 40° and 75° C. Also, in the present invention, is preferable to stop the polymerization reaction at a point of representing about 80% conversion since trying to obtain a higher conversion may cause a development of temporary fish eye and a low productivity due to the prolongation of reaction time.

The present invention will be more specifically explained in the following examples. However, it should be understood that the following examples are intended to illustrate the present invention and not to limit the scope of the present invention in any manner. Unless otherwise stated all parts therein are by weight.

EXAMPLES 1 TO 6 AND COMPARATIVE EXAMPLE 1

0.07 part of partially saponified polyvinyl alcohol was dissolved in 140 parts of water and then this solution was introduced into a polymerization reactor with 0.6 m of inner diameter, 0.28 $m^3$ of volume and triply equipped with an agitator of the present invention as represented according to each Example in the following Table 1. 0.048 part of di-2-ethyl hexyl peroxidicarbonate as an initiator was added thereto for deoxidation. Polymerization reaction was initiated by adding 100 parts (100 kg) of vinyl chloride monomer at the temperature of 57.5° C. When the inner pressure of the polymerization reactor was lowered to an amount of 0.5 $kg/cm^2$ than the normal one, the unreacted monomer was recovered and the prepared vinyl chloride resin (78% conversion) was obtained.

On the other hand, the vinyl chloride resin of comparative Example 1 was obtained in the same manner as mentioned above except that conventional Brumagine type agitator is used.

The physico-chemical properties of the vinyl chloride resin prepared in Examples 1 to 6 and Comparative Example 1 were determined according to the methods as described below and the results are represented in the following Table 1.

Methods for determination of physico-chemical properties
(1) Bulk density: determined by KS M3002
(2) Size distribution: determined according to Sieve method
(3) Porosity: the amount of mercury incorporated into 1.0 g of vinyl chloride resin at an absolute pressure range of 31 to 1011 psi was measured by mercury pressurized porosimeter (PO-2000; manufactured by Carlo Erba Co., Italy)
(4) Fish eye: 100 parts of vinyl chloride resin obtained from the polymerization reaction, 50 parts of plasticizer PN250 (adipic acid polyester; molecular weight is about 2000; manufactured by Adeka Co.), 3 parts of tribase, 0.5 part of stearic acid, 0.4 part of titanium dioxide and 0.2 part of carbon black were mixed together and allowed to stand for 3 hours. Then, the mixture was kneaded in 8 inches roll at 150° C. (sheet thickness of 0.2 mm), the prepared sheet was cut respectively at 8 min and 10 min therefrom and the number of transparent particles inside the sheet area of 10 cm×10 cm was counted.

EXAMPLE 7 AND COMPARATIVE EXAMPLE 2

The agitator according to the present invention represented in Table 1 was triply attached to a polymerization reactor with 0.286 m of inner diameter, 40 L of volume and equipped with a refluxing condenser of which heat transfer area is 0.4 $m^2$. 0.10 part of partially saponified polyvinyl alcohol dissolved in 170 parts of water was introduced into said polymerization reactor and 0.048 part of di-2-ethyl hexyl peroxidicarbonate as an initiator was added thereto for deoxidation. Polymerization reaction was initiated by adding 100 parts (10 kg) of vinyl chloride monomer to the reactor and then raising the temperature up to 57.5° C. When the conversion ratio represents 5%, cooling water was begun to pass through the reflux condenser and then the polymerization reaction was continually carried out while controlling an eliminated calory per unit hour at the reflux condenser being 400 kcal/hr within 30 minutes. When the inner pressure of the polymerization reactor was lowered to an amount of 0.5 kg/cm$^2$ than the normal one, the operation of the reflux condenser was stopped. Then, the unreacted monomer was recovered and the prepared vinyl chloride resin (78% conversion) was obtained.

On the other hand, the vinyl chloride resin of the Comparative Example 2 was obtained in the same procedure as Example 7 except that conventional Brumagine type agitator is used.

The physico-chemical properties of the vinyl chloride resin prepared in Example 7 and Comparative Example 2 were determined in the same methods as Examples 1 to 6 and Comparative Example 2 and the results are represented in the following Table 1.

TABLE 1

|  | EX. | | | | | | COM. EX. 1 | EX. 7 | COM. EX. 2 |
| --- | --- | --- | --- | --- | --- | --- | --- | --- | --- |
|  | 1 | 2 | 3 | 4 | 5 | 6 |  |  |  |
| Refluxing Condenser Attachment | x | x | x | x | x | x | x | o | o |
| α(°) | 5 | 10 | 15 | 30 | 45 | 60 | 0 | 30 | 0 |
| Area to Main wing (%) | 24 | 24 | 24 | 24 | 24 | 24 | 0 | 24 | 0 |
| Size Distribution |  |  |  |  |  |  |  |  |  |
| less than 60 (mesh) | 3.1 | 2.8 | 2.5 | 1.3 | 2.4 | 0.0 | 2.9 | 0.3 | 4.8 |
| 60–100 (mesh) | 75.3 | 80.1 | 77.3 | 83.1 | 50.9 | 32.1 | 78.9 | 84.1 | 38.3 |
| 100–150 (mesh) | 19.4 | 11.2 | 15.1 | 10.3 | 30.3 | 30.4 | 17.6 | 11.2 | 29.3 |
| 150–200 (mesh) | 1.7 | 4.4 | 5.8 | 4.1 | 10.4 | 20.3 | 1.6 | 3.1 | 21.4 |
| more than 200 (mesh) | 0.5 | 1.5 | 1.3 | 1.2 | 6.0 | 6.2 | 0.0 | 1.3 | 6.2 |
| Porosity (cc/g) | 0.16 | 0.17 | 0.20 | 0.23 | 0.21 | 0.18 | 0.15 | 0.22 | 0.13 |
| Bulk density (g/cc) | 0.49 | 0.49 | 0.48 | 0.47 | 0.49 | 0.49 | 0.50 | 0.48 | 0.51 |
| Fish Eye No./10 cm × 10 cm |  |  |  |  |  |  |  |  |  |
| 8 minutes | 143 | 139 | 115 | 75 | 111 | 135 | 145 | 125 | 827 |
| 10 minutes | 45 | 41 | 28 | 13 | 25 | 43 | 48 | 41 | 215 |

As shown in the above Table 1, the polyvinyl chloride resins prepared using the agitator according to the present invention (Examples 1 to 6) have superior physico-chemical properties including a reduction of fish eye in contrast to that prepared by means of the conventional Brumagine type agitator (Comparative Example 1). Such a tendency reaches to a maximum as the angle α of the backswept wing(4) approaches 30° since the uniformity and porosity of the particles are more and more increased. Further, in case a polymerization reactor is used in combination with a reflux condenser, the number of fish eye of a resin according to the present invention (Example 7) has greatly been reduced to an amount of 1/7 with respect to that of a resin obtained using the conventional Brumagine type agitator (Comparative Example 2).

Consequently, it is recognized that an excellent polyvinyl resin having desirable physico-chemical properties such as a diminution of fish eye, increment of porosity, etc., can be prepared by the polymerization method according to the present invention in which a polymerization reactor equipped with the improved agitator of the present invention is used and thus several problems raised before are solved.

What is claimed is:

1. An agitator for suspension polymerization which comprises:

an axis extending in an axial direction;

a plurality of supporting stems operatively connected to said axis and extending in a direction perpendicular with respect to the rotational direction of said axis;

a plurality of wings each operatively connected to a supporting stem, each wing comprising a main wing which having a planar surface extending in a plane perpendicular to the direction of the supporting stem; and a backswept wing having a planar surface joined along a straight edge of the planar surface of said main wing parallel to said axial direction; said backswept wing being inclined with respect to said main wing at an angle of 5° to 60° away from said axis.

2. The agitator of claim 1, wherein the backswept wing has an area in a range of 10 to 60% of the area of the main wing.

3. A suspension polymerization method which comprises conducting a polymerization reaction including agitating vinyl chloride monomer with the agitator of claim 1 in the presence of a polymerization initiator and a suspending agent.

4. The method of claim 3, wherein the step of agitating is conducted in a polymerization reactor equipped with a reflux condenser is used.

5. The method of claim 3, wherein said polymerization initiator is one or more members selected from the group consisting of lauroyl peroxide, 3,5,5-trimethyl hexyl peroxide, t-butyl peroxipivalate, t-butyl peroxineodecanoate, diisopropyl peroxidicarbonate, di-2-ethyl hexyl peroxidicarbonate, acetyl cyclohexyl sulfonylperoxide, α,α'-azobisisobutyronitrile and α,α'-azobis-2,4-methylvaleronitrile.

6. The method of claim 3, wherein said suspending agent is one or more members selected from the group consisting of partially saponified polyvinyl alcohol, vinyl acetate-maleic anhydride copolymer, polyvinyl pyrrolidone, gelatin, methyl cellulose, hydroxy propyl cellulose and hydroxy ethyl cellulose.

7. The method of claim 3, wherein the polymerization reaction is carried out at 40° to 75° C.

8. The method of claim 3, wherein the polymerization reaction is conducted in the presence of a molecular weight modifier.

9. The method of claim 8, wherein the molecular weight modifier is one or more members selected from the group consisting of benzene, toluene, t-butyl benzene, butanol, carbon tetrachloride and n-butyl mercaptan.

10. The method of claim 8, wherein the polymerization initiator, suspending agent and molecular weight modifier are added at one time before the polymerization reaction is carried out, or added over several times during the reaction.

11. The method of claim 3, wherein the polymerization initiator, suspending agent and molecular weight modifier are added at one time before the polymerization reaction is carried out, or added several times during the reaction.

12. The method of claim 3, wherein the vinyl chloride monomer is copolymerized with one or more monomers selected from the group consisting of ethylene, propylene, vinyl acetate, vinyl stearate, methyl acrylate, methylmetacrylate, maleic anhydride, fumaric anhydride, maleic ester, fumaric ester, acrylonitrile and vinylidene chloride.

* * * * *